United States Patent
Katou et al.

(10) Patent No.: US 7,743,605 B2
(45) Date of Patent: Jun. 29, 2010

(54) EXHAUST EMISSION PURIFYING APPARATUS FOR ENGINE

(75) Inventors: Toshikazu Katou, Ageo (JP); Hideki Matsunaga, Ageo (JP)

(73) Assignee: Nissan Diesel Motor Co., Ltd., Saitama (JP)

( * ) Notice: Subject to any disclaimer, the term of this patent is extended or adjusted under 35 U.S.C. 154(b) by 176 days.

(21) Appl. No.: 12/173,783

(22) Filed: Jul. 15, 2008

(65) Prior Publication Data

US 2008/0276601 A1 Nov. 13, 2008

Related U.S. Application Data

(63) Continuation of application No. PCT/JP2007/061636, filed on Jun. 8, 2007.

(30) Foreign Application Priority Data

Jun. 26, 2006 (JP) ............................. 2006-174860

(51) Int. Cl.
*F01N 3/00* (2006.01)

(52) U.S. Cl. ..................... 60/287; 60/277; 60/284; 60/295

(58) Field of Classification Search .............. 60/274, 60/277, 284–287, 295, 299–301
See application file for complete search history.

(56) References Cited

U.S. PATENT DOCUMENTS

2006/0196170 A1* 9/2006 Henning et al. ............... 60/286

FOREIGN PATENT DOCUMENTS

| EP | 1 176 292 A1 | 1/2002 |
| EP | 1 331 373 A2 | 7/2003 |
| EP | 1 634 637 A1 | 3/2006 |
| EP | 1 688 599 A1 | 8/2006 |
| FR | 2 879 657 A1 | 6/2006 |
| JP | 2000-027627 | 1/2000 |
| JP | 2002-242780 | 8/2002 |
| JP | 2003-222019 | 8/2003 |
| JP | 2003-269145 | 9/2003 |
| JP | 2005-147118 | 6/2005 |
| JP | 2006-077765 | 3/2006 |

OTHER PUBLICATIONS

U.S. Appl. No. 12/177,852, filed Jul. 22, 2008, Exhaust Emission Purifying Apparatus For Engine.
U.S. Appl. No. 10/574,346, filed Nov. 28, 2006, Engine Exhaust Emission Control Device And Exhaust Emission Control Method.
U.S. Appl. No. 10/577,222, filed Nov. 28, 2006, Exhaust Gas Purifying Apparatus And Exhaust Gas Purifying Method Of An Engine.
U.S. Appl. No. 11/790,739, filed Apr. 27, 2007, Exhaust Emission Purifying Apparatus For Engine.
U.S. Appl. No. 11/800,450, filed May 4, 2007, Exhaust Gas Purification Apparatus.
U.S. Appl. No. 11/812,871, filed Jun. 22, 2007, Exhaust Emission Purifying Apparatus For Engine.
U.S. Appl. No. 11/952,397, filed Dec. 7, 2007, Exhaust Gas Purifying Apparatus for Engine.
U.S. Appl. No. 12/173,791, filed Jul. 15, 2008, Atmospheric Temperature Detecting Apparatus And Exhaust Emission Purification Apparatus.

* cited by examiner

*Primary Examiner*—Thomas E. Denion
*Assistant Examiner*—Jesse Bogue
(74) *Attorney, Agent, or Firm*—McDermott Will & Emery LLP

(57) ABSTRACT

An exhaust emission purifying apparatus for an engine in which it is determined that a reducing agent supply system is clogged, which is arranged on the downstream of a pump carrying out suction and pumping of a liquid reducing agent out of a reducing agent tank, when a reduction in a pressure of the liquid reducing agent remaining in the downstream of the pump and also in the upstream of a flow control valve by an amount equal to or more than a first predetermined pressure does not occur until a cumulative injection amount obtained by sequentially integrating an injection amount of the liquid reducing agent computed in real time based on engine operating conditions reaches a predetermined amount after the pump has been temporarily stopped.

7 Claims, 4 Drawing Sheets

EXHAUST EMISSION PURIFYING APPARATUS FOR ENGINE

This application is a continuation of PCT/JP2007/061636, filed on Jun. 8, 2007.

BACKGROUND OF THE INVENTION

1. Field of the Invention

The present invention generally relates to an exhaust emission purifying apparatus for an engine (hereinafter, referred to as an exhaust emission purifying apparatus), which is provided for reductively purifying nitrogen oxides ($NO_x$) in an exhaust emission of the engine and, more particularly, relates to a technology for determining with high accuracy whether or not a supply system of a liquid reducing agent or precursor thereof brings about clogging.

2. Description of the Related Art

As a catalytic purification system which purifies $NO_x$ contained in the exhaust emission of an engine, there has been proposed, in Japanese Laid-open (Kokai) Patent Application Publication No. 2000-27627, an exhaust emission purifying apparatus. In this exhaust emission purifying apparatus, a liquid reducing agent or precursor thereof (to be referred to as "liquid reducing agent") according to engine operating conditions is injection-supplied to the exhaust emission at a position upstream of a $NO_x$ reduction catalytic converter disposed in an exhaust emission passageway of an engine exhaust system, so that $NO_x$ in the exhaust emission and the reducing agent are subjected to the catalytic-reduction reaction by which $NO_x$ is purified into harmless components.

Further, in this exhaust emission purifying apparatus, if a supply system of the liquid reducing agent (to be referred to as a reducing agent supply system) is clogged due to the deposition of a reducing agent component, the mixing-in of foreign substances or the like, the reducing agent of appropriate amount is not supplied to the $NO_x$ reduction catalytic converter, so that required $NO_x$ purification performance cannot be achieved. Therefore, there has been proposed, as disclosed in Japanese Laid-open (Kokai) Patent Application Publication No. 2006-77765, a technology for determining whether or not the reducing agent supply system is clogged based on a pressure reduction range, for a predetermined time, of the liquid reducing agent remaining in the reducing agent supply system, in a state where a pump for supplying the liquid reducing agent under pressure is stopped.

Since $NO_x$ is generated under a high temperature and high pressure condition, there is a state where $NO_x$ concentration in the exhaust emission is kept low depending on the engine operating conditions and accordingly, an exhaust emission purifying process does not need to be performed. Therefore, in the exhaust emission purifying apparatus using the reducing agent, from the standpoint of the prevention of unnecessary consumption of the reducing agent, such a configuration is employed that the liquid reducing agent is injection-supplied intermittently. Further, in the exhaust emission purifying apparatus, since the $NO_x$ concentration in the exhaust emission is changed along with the engine operating conditions, an injection amount of the liquid reducing agent is dynamically increased or decreased. Accordingly, the pressure reduction range for the predetermined time becomes very small and therefore, in the technology disclosed in Japanese Laid-open (Kokai) Patent Application Publication No. 2006-77765, there may be an erroneous determination of clogging although the reducing agent supply system has not yet brought about clogging.

SUMMARY OF THE INVENTION

Therefore, in view of the problems encountered by the above-described conventional technology, the present invention has an object to provide an exhaust emission purifying apparatus capable of determining with high accuracy whether or not a reducing agent supply system is clogged, even if the injection-supply of a liquid reducing agent is temporarily stopped or dynamically changed, utilizing such a characteristic that, when the liquid reducing agent remaining in the reducing agent supply system is injection-supplied in a state where a pump carrying out supply of the liquid reducing agent under pressure is stopped, the pressure of the liquid reducing agent regularly changes according to a cumulative injection amount of the liquid reducing agent.

In order to achieve the above-mentioned object, an exhaust emission purifying apparatus comprises: a reduction catalytic converter which is disposed in an engine exhaust system and reductively purifies $NO_x$ in an exhaust emission; a reducing agent tank which is capable of storing therein a liquid reducing agent; a pump which carries out suction of the liquid reducing agent out of the reducing agent tank to supply the liquid reducing agent under pressure; a flow control valve which controls a flow rate of the liquid reducing agent supplied by pumping of the pump; an injection nozzle which injection-supplies the liquid reducing agent flowing at a flow rate controlled by the flow control valve, to the exhaust emission flow at a position upstream of the reduction catalytic converter; and a control unit incorporating therein a computer, wherein the control unit: computes in real time an injection amount of the liquid reducing agent injection-supplied by the injection nozzle based on engine operating conditions; and determines that a reducing agent supply system arranged on the downstream of the pump brings about clogging, when a reduction in a pressure of the liquid reducing agent remaining in the downstream of the pump and also in the upstream of the flow control valve by an amount equal to or more than a first predetermined pressure does not occur until a cumulative injection amount obtained by sequentially integrating the injection amount computed in real time reaches a predetermined amount after the pump is temporarily stopped. Here, the liquid reducing agent is not limited to one produced by dissolving a reducing agent component (dissolved substance) in a solvent, and should be interpreted as a technical concept including precursor of the liquid reducing agent, by which the reducing agent can be generated by the chemical reaction.

According to the exhaust emission purifying apparatus of the present invention, it is determined that the reducing agent supply system arranged on the downstream of the pump brings about clogging, when the reduction in the pressure of the liquid reducing agent remaining in the downstream of the pump and also in the upstream of the flow control valve by an amount equal to or more than a first predetermined pressure does not occur until the cumulative injection amount which is obtained by sequentially integrating the liquid reducing agent injection amount computed in real time based on the engine operating conditions reaches the predetermined amount after the pump for performing suction and supply of the liquid reducing agent out of the reducing agent tank is temporarily stopped. Namely, in a normal exhaust emission purifying process, in order to enable the injection amount of the liquid reducing agent to be controlled via the flow control valve, the pump is appropriately controlled according to the engine operating conditions, and the pressure of the liquid reducing agent in the downstream of the pump is held approximately constant. Then, if the pump is temporarily stopped, only the liquid reducing agent remaining in the downstream of the pump and also in the upstream of the flow control valve contributes to the injection-supply thereof. At this time, if the reducing agent supply system does not bring about clogging, the pressure of the liquid reducing agent is regularly reduced as the cumulative injection amount is increased. On the other hand, if the reducing agent supply system brings about clogging, since the liquid reducing agent practically injection-supplied by the injection nozzle is very few or nil, the reduction in the pressure of the liquid reducing agent is extremely small during the increase in the cumulative injection amount. Therefore, even if the injection-supply of the liquid reducing agent is temporarily stopped or dynamically changed according to the engine operating conditions, it is possible to determine with high accuracy whether or not clogging is brought about in the reducing agent supply system, depending on whether or not the reduction in the pressure of the liquid reducing agent by the amount equal to or more than the predetermined pressure occurs until the cumulative injection amount reaches the predetermined amount after the pump is temporarily stopped.

DESCRIPTION OF THE PREFERRED EMBODIMENTS

Details of the present invention will be described hereunder, referring to the accompanying drawings.

Figure 1:
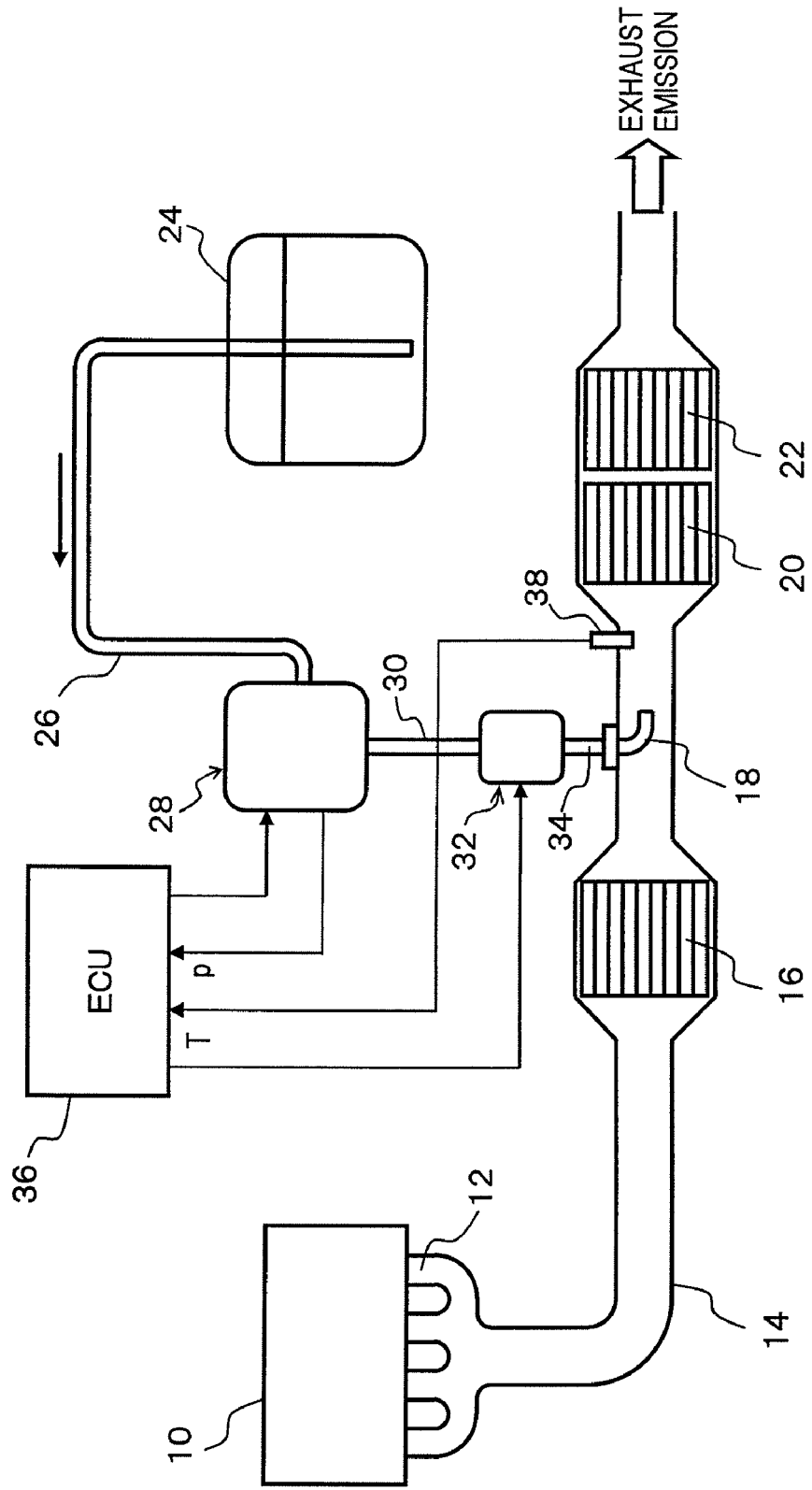
FIG. 1 is an entire block diagram of an exhaust emission purifying apparatus embodying the present invention.

FIG. 1 shows an entire configuration of an exhaust emission purifying apparatus which uses the urea aqueous solution which is precursor of a liquid reducing agent, for purifying $NO_x$ contained in the engine emission by the catalytic-reduction reaction.

In an exhaust pipe 14 connected to an exhaust manifold 12 of an engine 10, there are disposed, along an exhaust emission flow direction, a nitrogen oxidation catalytic converter 16 which oxidizes nitrogen monoxide (NO) into nitrogen dioxide ($NO_2$), an injection nozzle 18 which injection-supplies the urea aqueous solution, a $NO_x$ reduction catalytic converter 20 which reductively purifies $NO_x$ using ammonia obtained by hydrolyzing the urea aqueous solution, and an ammonia oxidation catalytic converter 22 which oxidizes ammonia passed through the $NO_x$ reduction catalytic converter 20.

Figure 2:
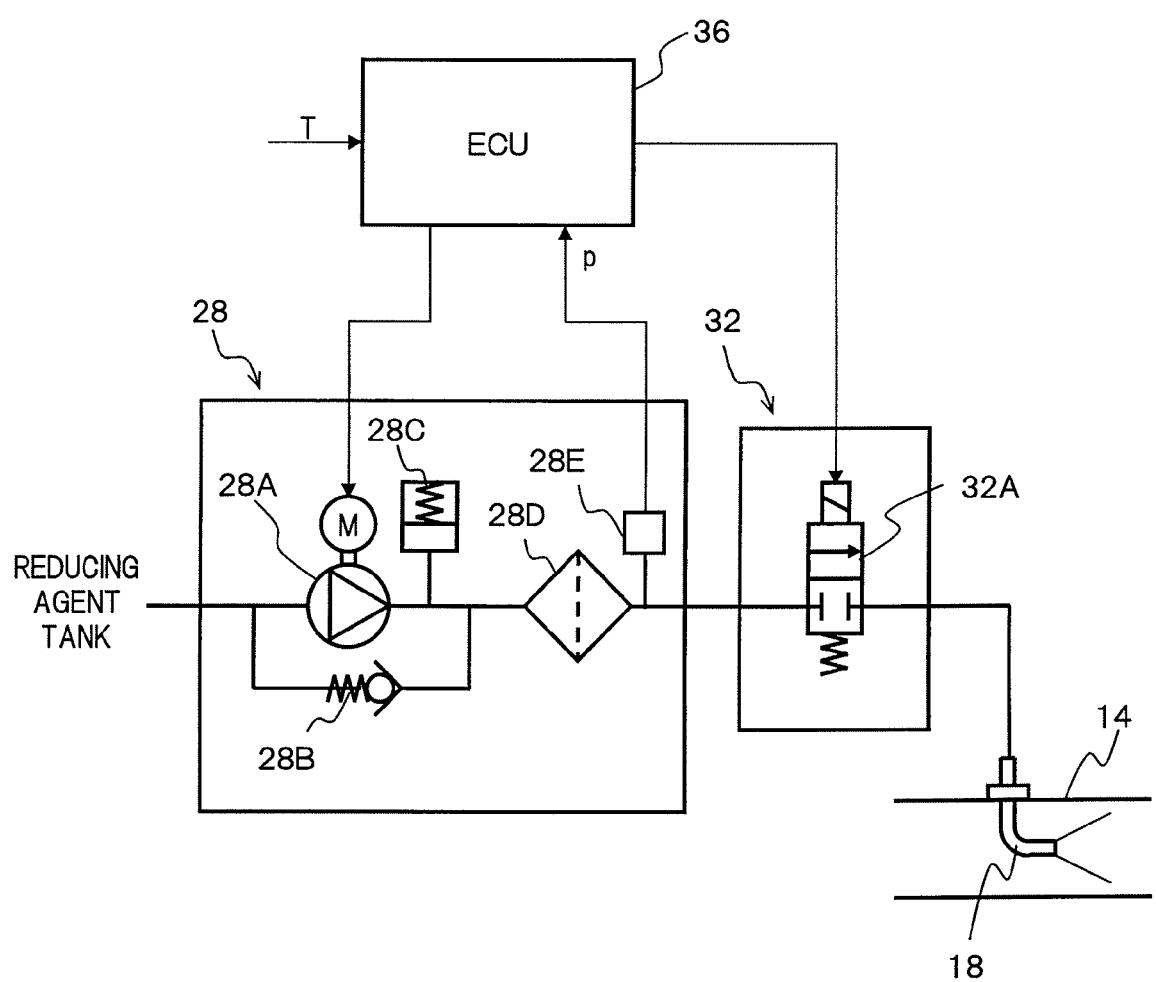
FIG. 2 is a detail block diagram of a pump module and a dosing module.

On the other hand, a reducing agent tank 24 which is provided for storing the urea aqueous solution is connected to and fluidly communicated with a pump module 28 for carrying out suction and supply of the urea aqueous solution, via a suction hose 26 having a suction port positioned on a bottom portion of the reducing agent tank 24. As shown in FIG. 2, the pump module 28 incorporates therein at least an electric pump 28A, a relief valve 28B, a buffer 28C, a filter 28D and a pressure sensor 28E for detecting a pressure p of the urea aqueous solution. Further, the pump module 28 is communicatively connected, via a pressure hose 30, to a dosing module 32 incorporating therein at least a flow control valve 32A (refer to FIG. 2) which can be remote-controlled, and also, the dosing module 32 is connected to and fluidly communicated with an injection nozzle 18 via a dosing hose 34. Then, the pump module 28 and the dosing module 32 are electronically controlled, respectively, by a reducing agent dosing control unit (to be referred to as a reducing agent dosing ECU) 36 incorporating therein a computer, so that the urea aqueous solution appropriate for engine operating conditions is injection-supplied from the injection nozzle 18.

In such an exhaust emission purifying apparatus, the urea aqueous solution injection-supplied by the injection nozzle 18 is hydrolyzed with the exhaust heat and the water vapor in the exhaust emission to be converted into ammonia performing as a reducing agent. It is known that converted ammonia reductively reacts with $NO_x$ contained in the exhaust emission in the $NO_x$ reduction catalytic converter 20 and is converted into water ($H_2O$) and nitrogen ($N_2$). At this time, in order to improve the $NO_x$ purification efficiency in the $NO_x$ reduction catalytic converter 20, NO is oxidized into $NO_2$ by the nitrogen oxidation catalytic converter 16, so that a rate between NO in the exhaust emission and $NO_2$ therein is improved to be suitable for the catalytic-reduction reaction. On the other hand, ammonia passed through the $NO_x$ reduction catalytic converter 20 is oxidized by the ammonia oxidation catalytic converter 22 disposed on the downstream side of the $NO_x$ reduction catalytic converter 20 in the exhaust passageway, and therefore, it is possible to prevent ammonia from being discharged into the atmosphere just as it is.

As one of features of the present invention, on the exhaust pipe 14, there is mounted an exhaust temperature sensor 38 for detecting the exhaust temperature T led into the $NO_x$ reduction catalytic converter 20. Then, respective output signals from the pressure sensor 28E incorporated in the pump module 28 and the exhaust temperature sensor 38 are input to the reducing agent dosing ECU 36, so that it is determined whether or not a reducing agent supply system arranged on the downstream of the electric pump 28A incorporated in the pump module 28 brings about clogging and the like, by a control program stored in a ROM (Read Only Memory) and the like of the reducing agent dosing ECU 36.

Here, before describing the details of the control program, there will be described a principle of determining whether or not the reducing agent supply system brings about clogging.

Figure 3:
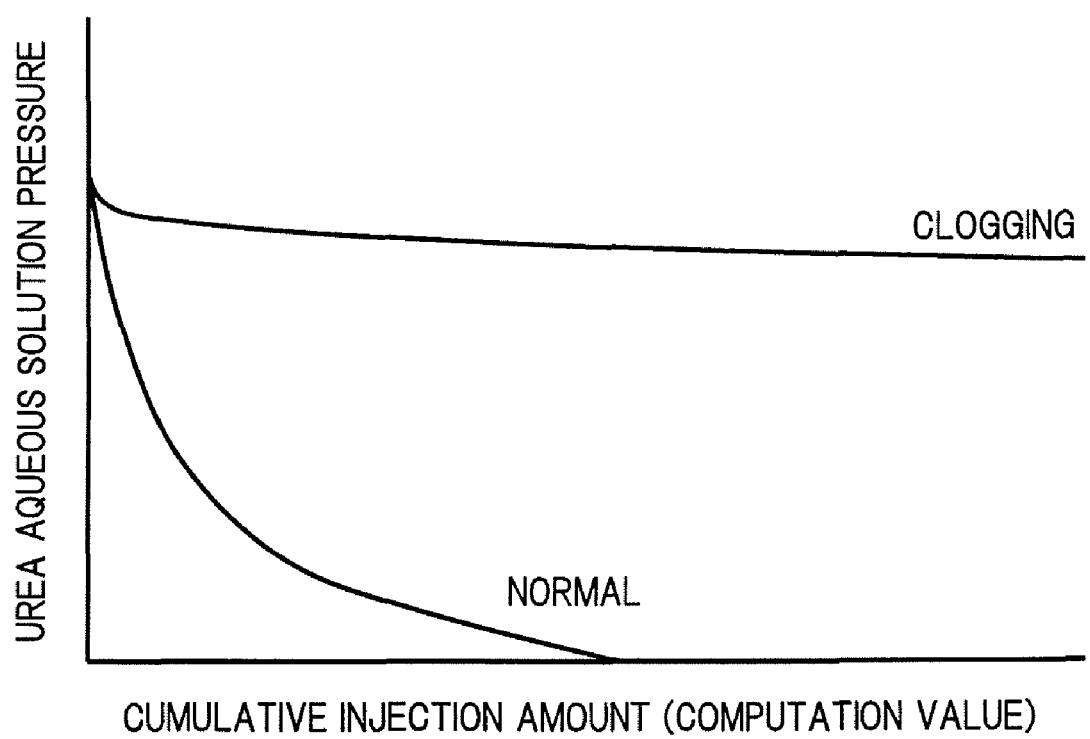
FIG. 3 is an explanatory diagram of a principle of determining whether or not clogging is brought about in a reducing agent supply system.

In a normal exhaust emission purifying process, in order to enable an injection amount of the urea aqueous solution to be controlled via the flow control valve 32A, the electric pump 28A is appropriately controlled according to the engine operating conditions, so that the pressure of the urea aqueous solution on the downstream of the electric pump 28A is held approximately constant. Then, if the electric pump 28A is temporarily stopped, only the urea aqueous solution remaining in the downstream of the electric pump 28A and also in the upstream of the flow control valve 32A contributes to the injection supply. At this time, if the reducing agent supply system is not brought about clogging, as shown in FIG. 3, the pressure of the urea aqueous solution regularly reduces as a cumulative injection amount obtained by sequentially integrating the injection amount (computation value) according to the engine operating conditions is increased. On the other hand, if the reducing agent supply system brings about clogging, since the urea aqueous solution practically injection-supplied by the injection nozzle 18 is very few or nil, as shown in FIG. 3, the pressure of the urea aqueous solution reduces only a very small amount during an increase in the cumulative injection amount. Therefore, it is possible to indirectly determine with high accuracy whether or not the reducing agent supply system brings about clogging, depending on whether or not reduction in the pressure of the urea aqueous solution by an amount equal to or more than a predetermined pressure occurs until the cumulative injection amount reaches a predetermined amount after the electric pump 28A has been temporarily stopped.

Figure 4:
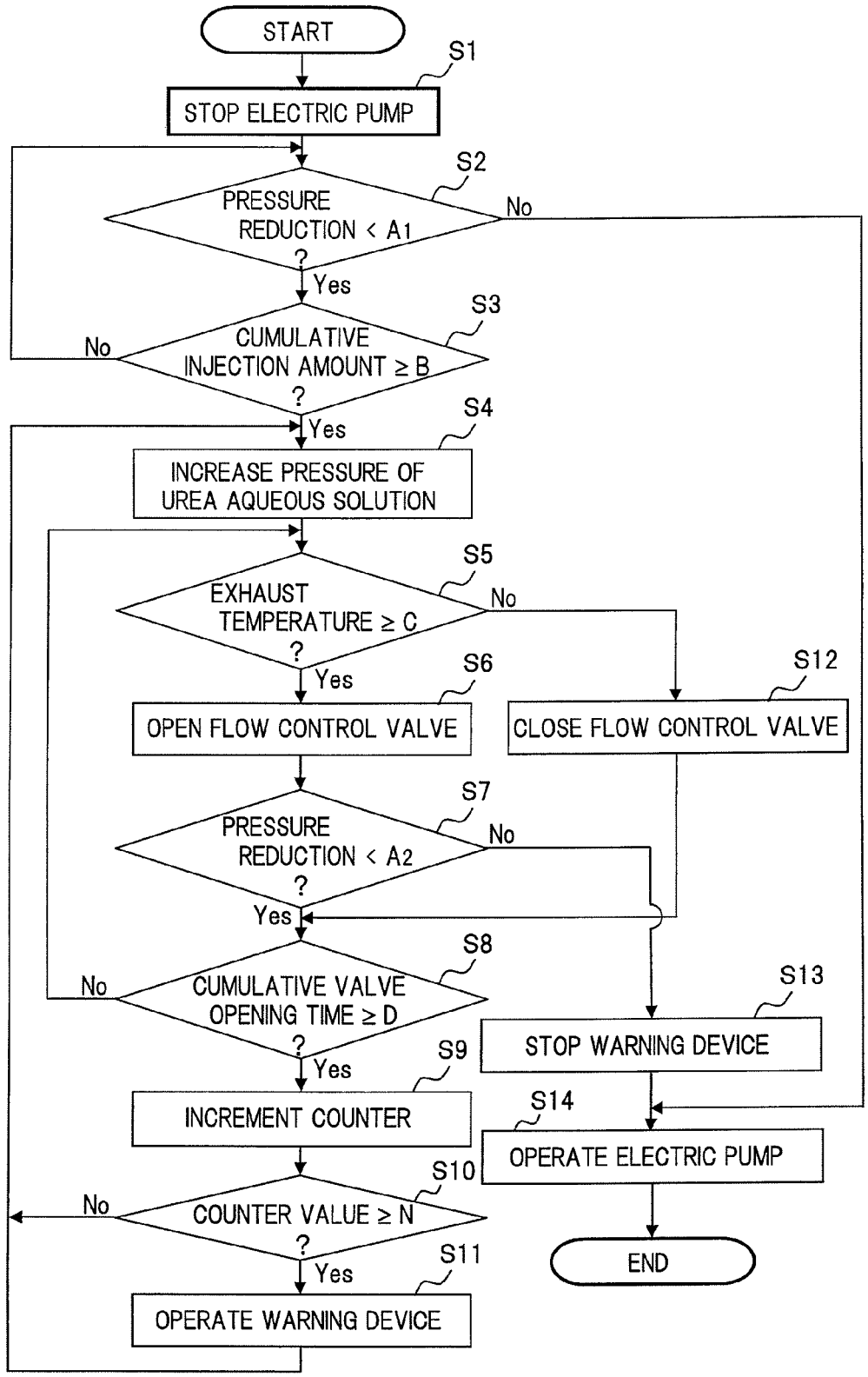
FIG. 4 is a flowchart showing a process content of a control program.

FIG. 4 shows a process content of the control program executed at each predetermined time (first predetermined time) on conditions that the engine 10 is being operated. Here, since the electric pump 28A is temporarily stopped when it is determined whether or not the reducing agent supply system brings about clogging, the control accuracy may be degraded due to a pressure variation in the urea aqueous solution injection-supplied by the injection nozzle 18. Therefore, it is desirable that the predetermined time is set at around 10 to 30 minutes. Further, by an injection amount computing process (not shown in the figure), the injection amount of the urea aqueous solution according to the engine operating conditions is computed in real time.

In step 1 (to be abbreviated as "S1" in the figure, and the same rule will be applied to the subsequent steps), the electric pump 28A incorporated in the pump module 28 is stopped. At this time, the urea aqueous solution remaining in the pressure hose 30 is maintained at a predetermined pressure $p_0$ by the normal exhaust emission purifying process.

In step 2, the pressure p is read from the pressure sensor 28E incorporated in the pump module 28, and it is determined whether or not the pressure reduction ($p_0$–p) of the urea aqueous solution from the time point when the electric motor 28A is stopped is less than a predetermined pressure $A_1$ (first predetermined pressure). Then, if the pressure reduction is less than the predetermined pressure $A_1$ (Yes), the routine proceeds to step 3, whereas if the pressure reduction is equal to or more than the predetermined pressure $A_1$ (No), it is determined that clogging is not brought about in the reducing agent supply system and the routine proceeds to step 14.

In step 3, it is determined whether or not the cumulative injection amount obtained by sequentially integrating the injection amount (computation value) of the urea aqueous solution reaches a predetermined amount B or more. Then, if the cumulative injection amount reaches the predetermined amount B or more (Yes), the routine proceeds to step 4, whereas if the cumulative injection amount is smaller than the predetermined amount B (No), the routine returns to step 2.

In step 4, the electric pump 28A incorporated in the pump module 28 is temporarily operated and the urea aqueous solution stored in the reducing agent tank 24 is supplied by pumping in order to increase the pressure of the urea aqueous solution in the pressure hose 30 to the predetermined pressure $p_0$.

In step 5, the exhaust temperature T is read from the exhaust temperature sensor 38, and it is determined whether or not the exhaust temperature T is equal to or higher than the predetermined temperature C. Here, the predetermined temperature C is set at the temperature (for example, 130° C.) at which urea is not deposited even if the urea aqueous solution is injection-supplied from the injection nozzle 18. Then, if the exhaust temperature T is equal to or higher than the predetermined temperature C (Yes), the routine proceeds to step 6, whereas if the exhaust temperature T is lower than the predetermined temperature C (No), the routine proceeds to step 12.

In step 6, the flow control valve 32A incorporated in the dosing module 32 is forcibly opened to a predetermined opening (for example, 90%), regardless of what type of operating condition the engine is now performing.

In step 7, the pressure p is read from the pressure sensor 28E incorporated in the pump module 28, and it is determined whether or not reduction ($p_0$–p) in the pressure of the urea aqueous solution from the time when the pressure of the urea aqueous solution is increased to the predetermined pressure $p_0$ is less than a predetermined pressure $A_2$ (second predetermined pressure). Then, if the above-mentioned reduction in the pressure comes below the predetermined pressure $A_2$ (Yes), the routine proceeds to step 8, whereas if the reduction in the pressure comes equal to or above the predetermined pressure $A_2$ (No), it is determined that the clogging in the reducing agent supply system is mended and the routine proceeds to step 13.

In step 8, it is determined whether or not a cumulative valve opening time during which the flow control valve 32A is forcibly kept opened reaches a predetermined time D (second predetermined time) or more. Here, the predetermined time D is a threshold for defining the cumulative time during which the flow control valve 32A is forcibly left opened, and is set at a time at which the urea aqueous solution can be supplied even if the electric pump 28A is not operated, taking the volume of the pressure hose 30 or the like into consideration. Then, if the cumulative valve opening time reaches the predetermined time D or more (Yes), the routine proceeds to step 9, whereas if the cumulative valve opening time is shorter than the predetermined time D (No), the routine returns to step 5.

In step 9, a counter for counting up the number of execution times of the process in steps 4 to 8 is incremented by 1.

In step 10, it is determined whether or not the counted value reaches a predetermined number of times N or more. Then, if the counted value reaches the predetermined number of times N or more (Yes), the routine proceeds to step 11, whereas if the counted value is less than the predetermined number of times N (No), the routine returns to step 4.

In step 11, in order to indicate that the reducing agent supply system brought about clogging, a warning device, such as a warning light, a buzzer or the like, is operated and thereafter, the routine returns to step 4.

In step 12, since the exhaust temperature T is lower than the predetermined temperature C, the flow control valve 32A incorporated in the dosing module 32 is forcibly closed in order to suppress the deposition of urea to an exhaust system and, thereafter, the routine proceeds to step 8.

In step 13, it is determined that the urea aqueous solution is flown into the reducing agent supply system so that the clogging in the reducing agent supply system is mended, and the warning device is stopped as required.

In step 14, since the reducing agent supply system does not bring about clogging or the clogging in the reducing agent supply system is mended, the electric pump 28A incorporated in the pump module 28 is started to operate in order to resume the normal exhaust emission purifying process.

According to such an exhaust emission purifying apparatus, the electric pump 28A incorporated in the pump module 28 is temporarily stopped at each predetermined time after the engine operation start, and it is determined whether or not reduction in the pressure of the urea aqueous solution remaining in the pressure hose 30 by an amount equal to or more than the predetermined pressure $A_1$ takes place until the cumulative injection amount obtained by sequentially integrating the injection amount of the urea aqueous solution computed in real time according to the engine operating conditions from the time when the electric pump 28A is temporarily stopped. Then, if the reduction in the pressure of the urea aqueous solution by an amount equal to or more than the predetermined pressure $A_1$ does not take place, it is determined that the reducing agent supply system has brought about clogging. On the other hand, if the reduction in the pressure of the urea aqueous solution by an amount equal to or more than the predetermined pressure $A_1$ has taken place, it is determined that the reducing agent supply system does not bring about clogging. Therefore, even if the injection supply of the urea aqueous solution is temporarily stopped or dynamically changed according to the engine operating conditions, it is possible to determine with high accuracy whether or not clogging occurs in the reducing agent supply system.

Further, when it is determined that the reducing agent supply system brings about clogging, considering a possibility that the clogging is caused by the urea deposition, a clogging mending process to mend the clogging is executed by permitting the urea aqueous solution to flow through the reducing agent supply system. Namely, in a state where the electric pump 28A incorporated in the pump module 28 is temporarily operated to increase a pressure of the urea aqueous solution in the pressure hose 30 to the predetermined pressure $p_0$, the flow control valve 32A incorporated in the dosing module 32 is forcibly kept opened for the predetermined time. Then, the urea aqueous solution is permitted to flow through the reducing agent supply system to thereby dissolve the deposited urea, so that the clogging in the reducing agent supply system is mended.

At this time, since clogging occurs in the reducing agent supply system, even though the flow control valve 32A is forcibly opened, there is an extremely small possibility that the urea aqueous solution is immediately injection-supplied from the injection nozzle 18. However, since the urea aqueous solution is injection-supplied by the injection nozzle 18 when the clogging is mended, it is desirable that the flow control valve 32A is opened only when the exhaust temperature T is equal to or higher than the predetermined temperature C, in order to suppress the urea deposition to the exhaust pipe 14, the NOx reduction catalytic converter 20 and the like.

On the other hand, when the pressure of the urea aqueous solution in the pressure hose 30 is reduced by an amount equal to or more than the predetermined pressure $A_2$ while the flow control valve 32A is being forcibly opened for the predetermined time, it is possible to determine that the clogging in the reducing agent supply system is mended. Contrary to this, if the pressure of the urea aqueous solution is not reduced by an amount equal to or more than the predetermined pressure $A_2$, it is desirable to repetitively execute the clogging mending process, to thereby mend the clogging. Then, when the clogging in the reducing agent supply system is not mended even though the clogging mending process is executed equal to or more than predetermined number of times N in a row, since there is a possibility that the clogging by, for example, foreign substances occurs, the warning device is brought into operation, i.e., energized in order to perform indication of the fact that an appropriate treatment such as a cleaning process should be executed.

Incidentally, the liquid reducing agent is not limited to the urea aqueous solution. It is possible to use the ammonia aqueous solution, or alcohol or diesel oil, which contain hydrocarbon as a main component thereof, or the like, taking the characteristics of the NOx reduction catalytic converter 20 into consideration.

It should be appreciated that the entire contents of Japanese Patent Application No. 2006-174860, filed on Jun. 26, 2006, on which the convention priority is claimed is incorporated herein by reference.

It should also be understood that many modifications and variations of the described embodiments of the invention will occur to a person having an ordinary skill in the art without departing from the spirit and scope of the present invention as claimed in the appended claims.

We claim:

1. An exhaust emission purifying apparatus for an engine, comprising:

a reduction catalytic converter which is disposed in an engine exhaust system and reductively purifies nitrogen oxides in the exhaust emission;

a reducing agent tank which is provided for storing therein a liquid reducing agent;

a pump which carries out suction and supply of the liquid reducing agent by pumping out of the reducing agent tank;

a flow control valve which controls a flow rate of the liquid reducing agent supplied by pumping of the pump;

an injection nozzle which injection-supplies the liquid reducing agent having flown from the flow control valve by which flow rate of the liquid reducing agent is controlled, to the exhaust emission at a position upstream of the reduction catalytic converter; and a control unit incorporating therein a computer, wherein the control unit computes in real time an injection amount of the liquid reducing agent injection-supplied by the injection nozzle based on engine operating conditions and also, determines that a reducing agent supply system arranged on the downstream of the pump brings about clogging, when a reduction in a pressure of the liquid reducing agent remaining in the downstream of the pump and also in the upstream of the flow control valve by an amount equal to or more than a first predetermined pressure does not occur until a cumulative injection amount obtained by sequentially integrating the injection amount computed in real time reaches a predetermined amount after the pump is temporarily stopped.

2. The apparatus according to claim 1, wherein the control unit carries out determination as to whether or not the reducing agent supply system brings about clogging, at each first predetermined time after an operation of the engine is started.

3. The apparatus according to claim 1, wherein the control unit forcibly opens the flow control valve for a second predetermined time when the control unit has determined that the reducing agent supply system brings about clogging, by temporarily operating the pump thereby increasing the pressure of the liquid reducing agent flowing in the downstream of the pump and also in the upstream of the flow control valve.

4. The apparatus according to claim 3, wherein the control unit forcibly opens the flow control valve for the second predetermined time only when the exhaust temperature is equal to or higher than the predetermined temperature.

5. The apparatus according to claim 3, wherein the control unit determines that the clogging in the reducing agent supply system is mended, when the reduction in the pressure of the liquid reducing agent remaining in the downstream of the pump and also in the upstream of the flow control valve by an amount equal to or more than a second predetermined pressure occurs while the flow control valve is being forcibly opened for the second predetermined time.

6. The apparatus according to claim 5, wherein the control unit repetitively carries out forcible opening of the flow control valve for the second predetermined time in a state where the pump is temporarily operated to increase the pressure of the liquid reducing agent in the downstream of the pump and also in the upstream of the flow control valve, until it is determines that the clogging in the reducing agent supply system is mended.

7. The apparatus according to claim 6, wherein when the control unit carries out forcible opening of the flow control valve for equal to or more than predetermined numbers of repetition in a row, the control unit activates a warning device, which is capable of indicating that the reducing agent supply system is clogged.

* * * * *